United States Patent
Abadi et al.

(10) Patent No.: US 10,136,282 B2
(45) Date of Patent: Nov. 20, 2018

(54) DYNAMIC DOWNLOAD POLICY FOR MOBILE APPLICATIONS

(71) Applicant: International Business Machines Corporation, Armonk, NY (US)

(72) Inventors: Aharon Abadi, Petach Tikva (IL); Idan Ben-Harrush, Givat Elah (IL); Samuel Kallner, D.N. Menashe (IL); Dmitri Pikus, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/015,154

(22) Filed: Feb. 4, 2016

(65) Prior Publication Data

US 2017/0230480 A1 Aug. 10, 2017

(51) Int. Cl.
*H04W 4/60* (2018.01)
*H04W 4/50* (2018.01)
*H04L 12/24* (2006.01)
*H04L 12/26* (2006.01)
*H04L 29/08* (2006.01)

(52) U.S. Cl.
CPC ............. *H04W 4/60* (2018.02); *H04L 41/082* (2013.01); *H04L 41/0893* (2013.01); *H04L 43/0817* (2013.01); *H04W 4/50* (2018.02); *H04L 67/2842* (2013.01)

(58) Field of Classification Search
CPC .............................. H04L 67/34; H04L 67/025
USPC ........................................................ 709/221
See application file for complete search history.

(56) References Cited

U.S. PATENT DOCUMENTS

| 8,726,343 | B1* | 5/2014 | Borzycki | G06F 21/6218 709/203 |
| 8,849,731 | B2 | 9/2014 | Lymberopoulos et al. | |
| 2009/0036102 | A1 | 2/2009 | Ho | |
| 2012/0289147 | A1* | 11/2012 | Raleigh | H04L 67/2847 455/3.06 |
| 2014/0040638 | A1* | 2/2014 | Barton | H04L 41/00 713/193 |
| 2014/0282636 | A1 | 9/2014 | Petander et al. | |

* cited by examiner

*Primary Examiner* — David Lazaro
*Assistant Examiner* — Zia Khurshid
(74) *Attorney, Agent, or Firm* — Ziv Glazberg

(57) ABSTRACT

Obtaining a dynamic download policy for a mobile application being executed on the mobile computing device, wherein the dynamic download policy indicating a download policy for a data item, the download policy is defined by the dynamic download policy as enabled in a first device context of the mobile computing device. During execution of the mobile application, a current device context of the mobile application is being monitored. In response to the mobile application attempting to download the data item and in response to the current device context being the first device context, the download policy may be enforced.

19 Claims, 3 Drawing Sheets

DYNAMIC DOWNLOAD POLICY FOR MOBILE APPLICATIONS

TECHNICAL FIELD

The present disclosure relates to applications executed on mobile computing device in general, and to download policies of such applications, in particular.

BACKGROUND

Mobile computing devices have become a common user device used by millions daily. Accordingly, millions of mobile applications have been development to date, and have been distributed. Many mobile application work with remote back end service or otherwise require and utilize a network connection. Data from back end server is fetched by application in most cases when application enters a screen. Some applications employ standard caching mechanisms to avoid re-downloading the same information over and over. The decision to employ caching mechanisms is made during the development of the application by the developer thereof and is hardcoded into the application.

BRIEF SUMMARY

One exemplary embodiment of the disclosed subject matter is a method executed by a mobile computing device having network connectivity, wherein the method comprising: obtaining a dynamic download policy for a mobile application being executed on the mobile computing device, wherein the dynamic download policy indicating a download policy for a data item, the download policy is defined by the dynamic download policy as enabled in a first device context of the mobile computing device; during execution of the mobile application, monitoring a current device context of the mobile application; and in response to the mobile application attempting to download the data item and in response to the current device context being the first device context, enforcing the download policy.

Another exemplary embodiment of the disclosed subject matter is a mobile computing device having a processor and network connectivity, the processor being adapted to perform the steps of: obtaining a dynamic download policy for a mobile application being executed on the mobile computing device, wherein the dynamic download policy indicating a download policy for a data item, the download policy is defined by the dynamic download policy as enabled in a first device context of the mobile computing device; during execution of the mobile application, monitoring a current device context of the mobile application; and in response to the mobile application attempting to download the data item and in response to the current device context being the first device context, enforcing the download policy.

Yet another exemplary embodiment of the disclosed subject matter is a computer program product comprising a non-transitory computer readable storage medium retaining program instructions, which program instructions when read by a processor, cause the processor to perform a method comprising: obtaining a dynamic download policy for a mobile application being executed on a mobile computing device, wherein the dynamic download policy indicating a download policy for a data item, the download policy is defined by the dynamic download policy as enabled in a first device context of the mobile computing device, during execution of the mobile application, monitoring a current device context of the mobile application; and in response to the mobile application attempting to download the data item and in response to the current device context being the first device context, enforcing the download policy.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is reducing network traffic for mobile applications.

In some exemplary embodiments, network traffic involved in fetching data is one of the main causes for battery drain. Modern applications are designed to run on variety of devices with different form factors, and the applications are invoked in different device context, such as relating to battery state, network bandwidth, charges for network utilization, mobile data amount limits, or the like.

One technical solution is to enable a dynamic download policy to be defined and implemented. In some exemplary embodiments, the policy may be applied by an external platform to the mobile application, thereby allowing users and developers other than the developer of the mobile application, to control and potentially minimize network traffic utilized by the mobile application.

In some exemplary embodiments, the policy may be a dynamic policy that depends on a device context of the mobile device. Taking into consideration the device context enables dynamic determination of fetched data as opposed to statically setting such determination during application design.

For example, the mobile application may load new screen with fields that do not change during application execution. Such data need not be re-fetched when a battery level is low and instead it may be obtained from a cache thereby preserving the battery power. Additionally or alternatively, non-important fields may not be fetched when a mobile package of the mobile device is almost finished, thereby preserving the limited available network resources of the mobile device. As another example, after an application passes through a gateway screen, such as entering credit card information to checkout and complete a purchase process, it may be desired to reduce the likelihood that the session be irreversibly dropped. In order to reduce such likelihood, caching mechanism may be enabled after the gateway screen is encountered or passed through, and such mechanism may be disabled after a second gateway screen is encountered or passed through, such as reaching a purchase summary screen after completing the purchase process.

One technical effect of the disclosed subject matter may be to reduce usage of resource of the mobile device, when such resources are substantially limited. The disclosed subject matter may allow for smart utilization of the mobile device's limited resources. As an example, consider a mobile device having a low battery level, fetching unimportant data from the web would waste the limited power supply, and might prevent from the user obtaining the data she is most interested in. The disclosed subject matter may assist the user in shifting resource utilization based on the context of the device.

Figure 1:
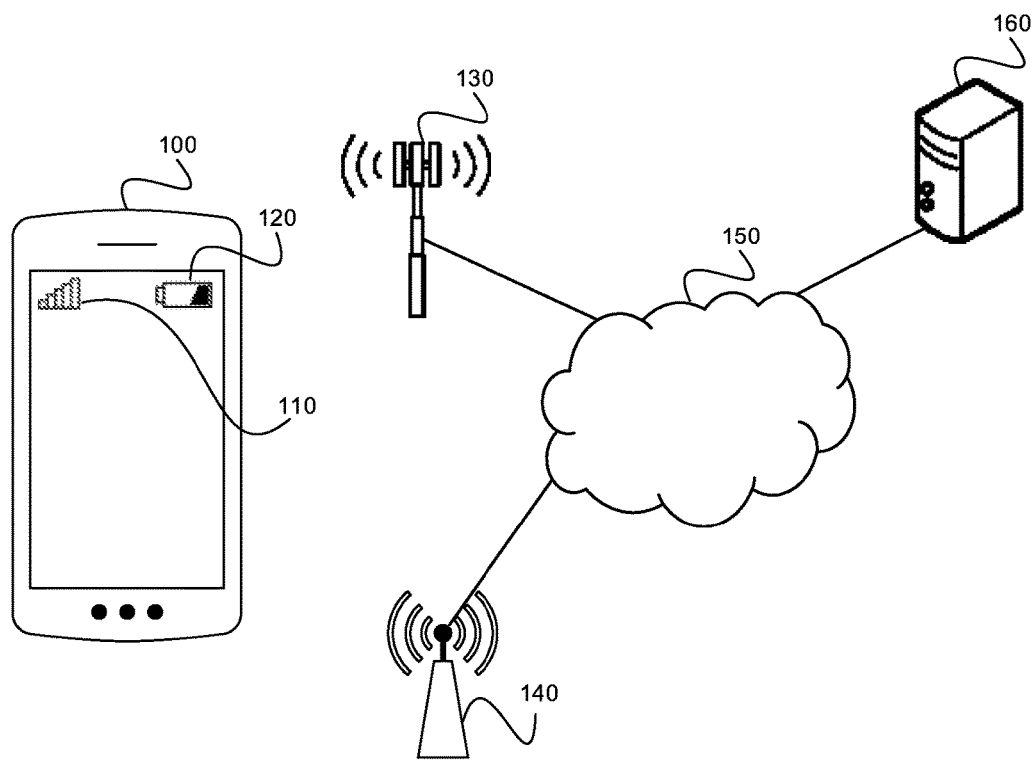
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

Mobile Computing Device (MCD) 100, such as a mobile phone, a Personal Digital Assistant (PDA), a tablet computer, or the like, may be a computerized device having network connectivity and being mobile. MCD 100 may connect to a Network 150, such as the Internet, an intranet, a Local Area Network (LAN), or the like, via one or more connection methods, including wired connection (not shown) and wireless connection. In some exemplary embodiments, network connectivity of MCD 100 may be achieved via Wi-Fi 140. Additionally or alternatively, network connectivity of MCD 100 may be achieved via a Cellular Data Connection 130.

A device context of MCD 100 may be a battery charge level (e.g., indicated via a Battery Indicator 120), a connectivity method (e.g., Wi-Fi connection, 3G connection, 4G connection, LTE connection, or the like. The connectivity method may be indicated by Connectivity Indicator 110), a connection level (e.g., weak or strong signal, as may be indicated by Connectivity Indicator 110), network package utilization level (e.g., remaining 10 MB of volume in a network plan that can be utilized by MCD 100, utilizing 95% of the network package, or the like). In some exemplary embodiments, the device context may be a context of reaching a gateway screen in an application, such as reaching a login screen, passing a login screen, reaching a checkout screen and before reaching a transaction completion screen, or the like.

In some exemplary embodiments, a dynamic download policy may be defined for a mobile application (app) executed by MCD 100. The dynamic download policy may determine dynamically, based on the device context of MCD 100, whether to obtain data from a network connectivity (e.g., from Server 160 via Network 150) or not. In some cases, data may be blocked from being obtained. As an example, media item, such as streaming video, audio file, or the like, may not be obtained when network package utilization level is below a minimal threshold. Such policy may assist in avoiding complete and potentially unintentional depletion of the network package.

Additionally or alternatively, a data item may be obtained from a local cache memory. Additionally or alternatively, different policies may be determined for a same data items for different device contexts. In some exemplary embodiments, the dynamic policy may define when caching of a certain data item commences, such as when battery level below 20%, and upon battery level being below 10%, MCD 100 may start retrieving the data item from the cache instead via the network connection. In some exemplary embodiments, a different policy may be defined for different data items, such as data fields in a screen. For example, field "A" may be defined to be retrieved from cache when reaching 10%, while field "B" may be defined as always being retrieved from the network.

In some exemplary embodiments, the disclosed subject matter may be implemented by the mobile application itself, which may be configured to obtain a dynamic download policy, such as from a digital file or via a network connection, and implement the defined policy.

Additionally or alternatively, the mobile application may not be aware of the existence of the dynamic download policy and such policy may be implemented by a computing platform of MCD 100, such as by an operating system, an execution environment, or the like. In some exemplary embodiments, the computing platform may monitor the device context of MCD, and may monitor network requests issued by the mobile application. The computing platform may, for example, be implemented in the Application Program Interface (API) used by the mobile application to retrieve data from Network 150 so as to allow blocking of download requests and diverting network requests to access a cache memory instead.

In some exemplary embodiments, the computing platform may require to be aware of which field is being accessed by each network retrieval request. Bytecode or other object code representation of the mobile application may be examined and used to infer for each request variables being used thereon and accordingly the fields that are being retrieved in each request. Additionally or alternatively, in web applications (web apps), retrieved field may be identified based on the tags of the retrieval request. The fields in the web app may be identified by exploring a Document Object Model (DOM) of a document in the web app that represents a screen.

In some exemplary embodiments, the dynamic download policy may be defined for a mobile application, such that a different policy may be defined and implemented for each mobile application. Additionally or alternatively, the policy may be defined for MCD 100 and implemented equally for all mobile applications executed thereon.

Figure 2:
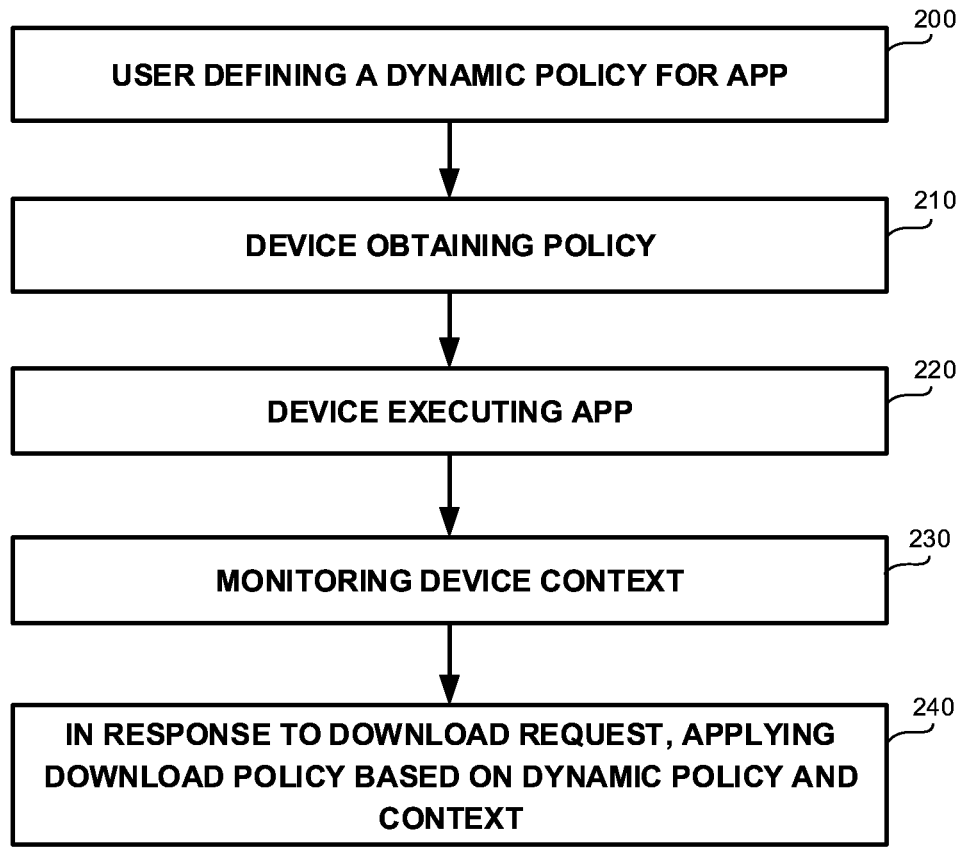
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, a dynamic policy may be defined by a user. The user may be a developer of an app defining a policy for the app. Additionally or alternatively, the user may be a user of the app defining a personalized policy for the app. Additionally or alternatively, the user may be a third part developer defining the policy. The dynamic policy may be defined for a specific app. Additionally or alternatively, the dynamic policy may be defined for all apps executed on a device implementing the policy. Device-level policies may be useful for general blocking of items of predetermined types, such as media items. App-specific policies may be hand-tailored and designed for optimal operating given the specific details and field of the app for which the policy is being defined. In some exemplary embodiments, the policy may be defined after the app is already distributed and without updating the app (e.g., not requiring to update executable of the app). Additionally or alternatively, the policy may be altered by the user after the application is distributed and without updating the app itself.

On Step 210, the mobile device may obtain the policy. The device may obtain the policy from a network, such as by accessing a policy repository. Additionally or alternatively, the policy may be retrieved from local storage of the device, such as in case the user manually defines the policy using the device itself.

On Step 220, the mobile device executes the app.

On Step 230, device context is being monitored. In some exemplary embodiments, a monitoring sub-system is employed to perform such monitoring. The monitoring sub-system may require access permissions that would allow for monitoring the device context.

On Step 240, after identifying a download request, the policy obtained in Step 210 is applied. The policy may define for a device context as monitored in Step 220 a behavior and such behavior may be implemented. In some exemplary embodiments, a different behavior may be defined for different data items. In such a case, the data item accessed by the download request may be identified and a policy for such data item may be obtained and implemented.

Figure 3:
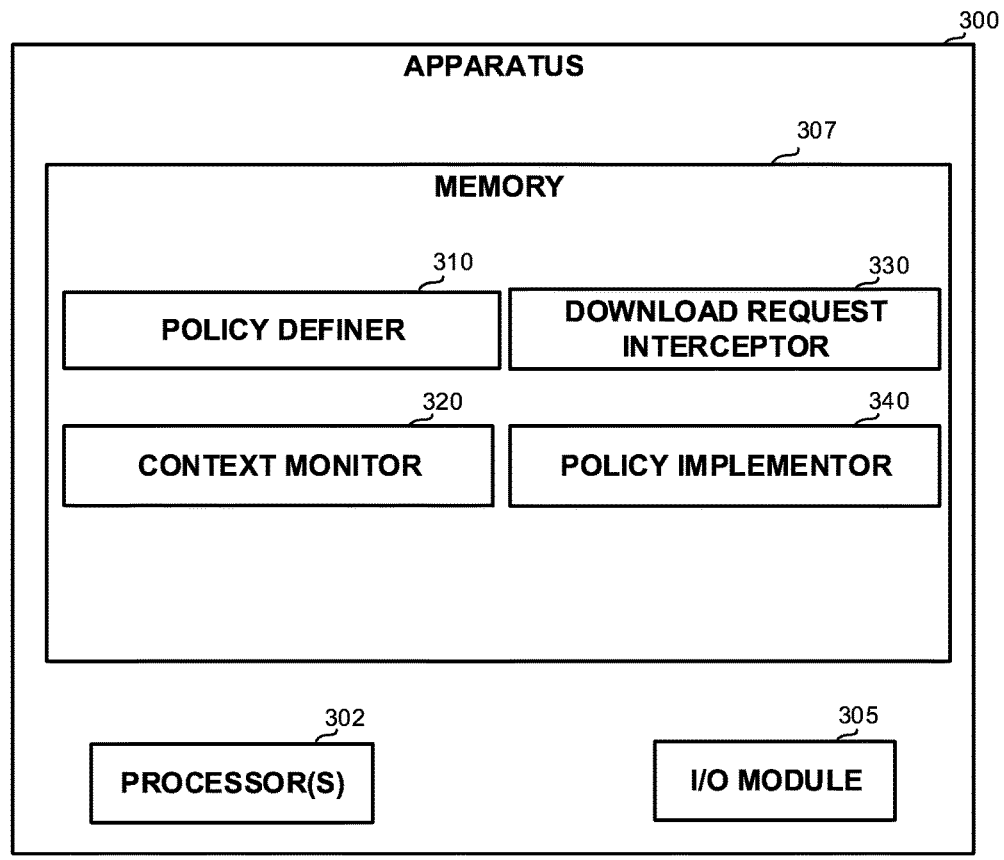
FIG. 3 shows a block diagram of an apparatus, in accordance with some exemplary embodiments of the disclosed subject matter.

Referring now to FIG. 3 showing a block diagram of an apparatus in accordance with some exemplary embodiments of the disclosed subject matter. In some exemplary embodiments, Apparatus 300 may be a mobile computing device.

In some exemplary embodiments, Apparatus 300 may comprise a processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, to provide network access, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may comprise a cache memory unit (not shown), which may be physically separate from Memory 307 or a logical portion of storage space of Memory 307, such as when local storage is used as a cache of network data. In some exemplary embodiments, Memory 307 may retain program code operative to cause Processor 302 to perform acts associated with any of the subcomponents of Apparatus 300.

Policy Definer 310 may be configured to define a policy. The policy may be defined based on user input, such as selecting a target app for which the policy is defined, defining rules in the policy. A defined rule may comprise a condition relating to the device context that when held, downloading of a target data item (e.g., specific data item defined by name, a data item of a certain type, or the like) is restricted or otherwise limited. The restriction may be a requirement to prefer retrieving the content of the target data item from the cache, if such content is available. In case the content is not available, the content may be downloaded or alternatively may be blocked, determining on the defined rule. The condition may define, for example, a threshold battery charge level, a threshold network connectivity level, a threshold network package utilization level, a connectivity method, a gateway screen, or the like. In some exemplary embodiments, a plurality of different rules may be defined for a same data item. Additionally or alternatively, a first rule for a data item may define a first condition that when held, the content of the data item begins to be cached (while still retrieving the content via a network connection). A second rule for the data item may define a second condition that when held, the content of the data item is retrieved from the cache.

Context Monitor 320 may be configured to a device context of Apparatus 300. Context Monitor 320 may monitor battery charge level, network connectivity level, connectivity method, network package utilization level, or the like. In some exemplary embodiments, Context Monitor 320 may monitor the screens displayed by an app, whereby Context Monitor 320 may be capable of determining whether app reached or passed through a gateway screen.

Download Request Interceptor 330 may be configured to intercept download requests and invoke Policy Implementor 340. In some exemplary embodiments, the download requests may be performed via an API that is controlled by Download Request Interceptor 330. Additionally or alternatively, download requests via third-party APIs may be intercepted using Man in the Middle techniques. Only upon Policy Implementor 340 determining that the policy allows downloading of the data item, the request may be provided to the third party API.

Policy Implementor 340 may be configured to determine current context (using Context Monitor 320), identify data item to be retrieved in the download request, and determine whether to allow the download request to proceed. In some exemplary embodiments, based on the rules and conditions defined in the policy, the download request may be blocked entirely. Additionally or alternatively, the download request may be diverted to retrieve data from the cache memory unit. In case the data is not retained in the cache memory unit, the policy may define whether or not to allow obtaining the data from the network and caching the retrieved data for future requests. In some exemplary embodiments, Policy Implementor 340 may be configured to force caching of data retrieved from a network connection, based on the rules and conditions defined by the policy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only s memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area s network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram s block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method executed by a mobile computing device having network connectivity, wherein the method comprising:
    obtaining a dynamic download policy for a mobile application being executed on the mobile computing device, wherein the mobile application is configured to download data items while being executed,
    wherein the dynamic download policy indicating a download policy for a data item being downloaded by the mobile application,
    the download policy is defined by the dynamic download policy as enabled in a first device context of the mobile computing device;
    wherein the first device context is selected from the group consisting of: a threshold battery charge level;

a threshold network connectivity level; and
a threshold network package utilization level;
during execution of the mobile application, monitoring a current device context of the mobile application; and in response to the mobile application attempting to download the data item and in response to the current device context being the first device context, enforcing the download policy with respect to downloading the data item.

2. The method of claim 1, wherein the first device context is selected from the group consisting of:
a threshold battery charge level;
a threshold network connectivity level; and
a threshold network package utilization level.

3. The method of claim 1, wherein the first device context is the mobile application being after passing through a gateway screen.

4. The method of claim 1, wherein the dynamic download policy defining whether the data item is retrieved from a network connection or from a cache memory.

5. The method of claim 1, wherein the dynamic download policy defining a plurality of download policies for the data item, wherein a first download policy for the data item defining a first condition that when held, the data item is retrieved from a network connection and retained in a cache memory; and wherein the second download policy for the data item defining a second condition that when held, the data item is retrieved from the cache memory, wherein the first condition is configured to be held prior to the second condition being held.

6. The method of claim 1, wherein the data item is a data field, content of which is retrievable from a network.

7. The method of claim 1, wherein the data item is a type of media item that is retrievable by the mobile application from a network.

8. The method of claim 1, wherein said monitoring and said enforcing are performed by a computing platform external to the mobile application.

9. The method of claim 8, wherein the computing platform is an operating system of the mobile computing device.

10. A mobile computing device having a processor and network connectivity, the processor being adapted to perform the steps of:
obtaining a dynamic download policy for a mobile application being executed on the mobile computing device, wherein the mobile application is configured to download data items while being executed, wherein the dynamic download policy indicating a download policy for a data item being downloaded by the mobile application, the download policy is defined by the dynamic download policy as enabled in a first device context of the mobile computing device;
wherein the first device context is selected from the group consisting of:
a threshold battery charge level; a threshold network connectivity level; and a threshold network package utilization level;
during execution of the mobile application, monitoring a current device context of the mobile application; and in response to the mobile application attempting to download the data item and in response to the current device context being the first device context, enforcing the download policy with respect to downloading the data item.

11. The mobile computing device of claim 10, wherein the first device context is selected from the group consisting of:
a threshold battery charge level;
a threshold network connectivity level; and
a threshold network package utilization level.

12. The mobile computing device of claim 10, wherein the first device context is the mobile application passing through a gateway screen.

13. The mobile computing device of claim 10, wherein the dynamic download policy defining whether the data item is retrieved from a network connection or from a cache memory.

14. The mobile computing device of claim 10, wherein the dynamic download policy defining a plurality of download policies for the data item, wherein a first download policy for the data item defining a first condition that when held, the data item is retrieved from a network connection and retained in a cache memory; and wherein the second download policy for the data item defining a second condition that when held, the data item is retrieved from the cache memory, wherein the first condition is configured to be held prior to the second condition being held.

15. The mobile computing device of claim 10, wherein the data item is a data field, content of which is retrievable from a network.

16. The mobile computing device of claim 10, wherein the data item is a type of media item that is retrievable by the mobile application from a network.

17. The mobile computing device of claim 10, wherein said monitoring and said enforcing are performed by a computing platform external to the mobile application.

18. The mobile computing device of claim 17, wherein the computing platform is an operating system of the mobile computing device.

19. A computer program product comprising a non-transitory computer readable storage medium retaining program instructions, which program instructions when read by a processor, cause the processor to perform a method comprising:
obtaining a dynamic download policy for a mobile application being executed on a mobile computing device, wherein the mobile application is configured to download data items while being executed, wherein the dynamic download policy indicating a download policy for a data item being downloaded by the mobile application, the download policy is defined by the dynamic download policy as enabled in a first device context of the mobile computing device,
wherein the first device context is selected from the group consisting of a threshold battery charge level;
a threshold network connectivity level; and a threshold network package utilization level, during execution of the mobile application, monitoring a current device context of the mobile application; and in response to the mobile application attempting to download the data item and in response to the current device context being the first device context, enforcing the download policy with respect to downloading the data item.

* * * * *